United States Patent
Pyne et al.

(10) Patent No.: US 10,451,472 B2
(45) Date of Patent: Oct. 22, 2019

(54) SYSTEMS AND METHODS FOR DETERMINING STOCK QUANTITIES USING A CAPACITIVE INVENTORY SENSOR

(71) Applicant: Shelfbucks, Inc., Austin, TX (US)

(72) Inventors: John W. Pyne, Florence, AZ (US);
Gary L. Overhultz, Oak Park, IL (US);
Gordon E. Hardman, Longmont, CO (US)

(73) Assignee: SHELFBUCKS, INC., Austin, TX (US)

( * ) Notice: Subject to any disclaimer, the term of this patent is extended or adjusted under 35 U.S.C. 154(b) by 0 days.

(21) Appl. No.: 15/390,852

(22) Filed: Dec. 27, 2016

(65) Prior Publication Data

US 2017/0108370 A1      Apr. 20, 2017

Related U.S. Application Data

(62) Division of application No. 13/487,304, filed on Jun. 4, 2012, now abandoned.

(60) Provisional application No. 61/493,190, filed on Jun. 3, 2011.

(51) Int. Cl.
*G06Q 10/08* (2012.01)
*G01G 7/06* (2006.01)
*G01G 19/42* (2006.01)
*G07F 11/00* (2006.01)

(52) U.S. Cl.
CPC .............. *G01G 19/42* (2013.01); *G01G 7/06* (2013.01); *G06Q 10/087* (2013.01); *G07F 11/00* (2013.01)

(58) Field of Classification Search
CPC ...................................................... B65H 3/00
See application file for complete search history.

(56) References Cited

U.S. PATENT DOCUMENTS

| | | |
|---|---|---|
| 6,628,764 B1 | 9/2003 | Petite |
| 2003/0057226 A1 | 3/2003 | Long |
| 2007/0289990 A1 | 12/2007 | Artsiely |
| 2009/0114041 A1 | 5/2009 | Harish et al. |

(Continued)

OTHER PUBLICATIONS

Schechter, Andrew M., "Restriction Requirement for U.S. Appl. No. 13/487,304", dated Oct. 1, 2015, 8 pages.

(Continued)

*Primary Examiner* — Andrew Schechter
*Assistant Examiner* — Mark I Crohn
(74) *Attorney, Agent, or Firm* — Medley, Behrens & Lewis, LLC

(57) ABSTRACT

Systems and methods are provided for a capacitive inventory sensor. A system includes a track configured for retaining items. A first conducting plate is positioned along a portion of the track, and a second conducting plate is positioned in parallel with the first conducting plate along a portion of the track. The second conducting plate is positioned a distance from the first conducting plate, and the second plate is configured to have the items placed on top of the second plate. The system further includes a capacitance sensor configured for connection to the first and second conducting plates, where the capacitance sensor is configured to measure a capacitance between the first and second conducting plates, and where the capacitance varies based on a number of items positioned on the sensor track.

14 Claims, 21 Drawing Sheets

(56) References Cited

U.S. PATENT DOCUMENTS

| | | | |
|---|---|---|---|
| 2009/0248198 A1* | 10/2009 | Siegel | G06Q 10/08 700/231 |
| 2011/0055103 A1* | 3/2011 | Swafford, Jr. | A47F 1/126 705/345 |
| 2012/0310570 A1 | 12/2012 | Pyne et al. | |
| 2013/0131618 A1* | 5/2013 | Abraham | A61F 13/42 604/361 |

OTHER PUBLICATIONS

Lewis, Nathan T., "Response to the Restriction Requirement for U.S. Appl. No. 13/487,304", filed Dec. 1, 2015, 6 pages.
Crohn, Mark I., "Non-Final Office Action for U.S. Appl. No. 13/487,304", dated Jan. 21, 2016, 12 pages.
Lewis, Nathan T., "Response to the Non-Final Office Action for U.S. Appl. No. 13/487,304", filed Jun. 21, 2016, 10 pages.
Crohn, Mark I., "Final Office Action for U.S. Appl. No. 13/487,304", dated Jul. 27, 2016, 13 pages.
Lewis, Nathan T., "Response to the Final Office Action for U.S. Appl. No. 13/487,304", filed Dec. 27, 2016, 9 pages.
Crohn, Mark I., "Advisory Action for U.S. Appl. No. 13/487,304", dated Jan. 20, 2017, 3 pages.
Crohn, Mark I., "Notice of Abandonment for U.S. Appl. No. 13/487,304", dated Mar. 8, 2017, 2 pages.

* cited by examiner

Linear Response of CIS with 200pF external Capacitor

SYSTEMS AND METHODS FOR DETERMINING STOCK QUANTITIES USING A CAPACITIVE INVENTORY SENSOR

CROSS-REFERENCE TO RELATED APPLICATIONS

This application is a divisional of U.S. application Ser. No. 13/487,304 (published as U.S. 2012/0310570 A1), filed Jun. 4, 2012, entitled "Systems and Methods for Determining Stock Quantities Using a Capacitive Inventory Sensor," which in turn claimed the benefit of priority to U.S. Provisional Patent Application No. 61/493,190, filed Jun. 3, 2011, entitled "Determining Stock Quantities Using a Capacitive Inventory Sensor." The entirety of these prior applications are herein incorporated by reference.

TECHNICAL FIELD

The technology described herein relates generally to inventory detection and more specifically to inventory detection based on capacitance variation.

BACKGROUND

In retail environments, there are a variety of systems that mechanically move products so that they may be more easily seen and accessed by customers. These may be gravity fed, or have some sort of stored energy, such as a spring, which pushes product to the front of the display; hence these devices are frequently generically referred to as "pushers". Though more expensive than simply depositing product on the bare shelves and allowing customers to move items at their discretion, pushers are rapidly cost-justified for certain products by the resulting lift in sales and reduced labor costs associated with restoring order to product that has been "shopped." Retailers are rapidly adopting pusher systems and expanding their use within stores to include more product lines.

SUMMARY

In accordance with the teachings herein, computer-implemented systems and methods are provided for a capacitive inventory sensor. A system includes a track configured for retaining items. A first conducting plate is positioned along a bottom portion of the track, and a second conducting plate is positioned in parallel with the first conducting plate along the bottom portion of the track. The second conducting plate is positioned a distance from the first conducting plate, and the second plate is configured to have the items placed on top of the second plate. The system further includes a capacitance sensor configured for connection to the first and second conducting plates, where the capacitance sensor is configured to measure a capacitance between the first and second conducting plates, and where the capacitance varies based on a number of items positioned on top of the second plate.

As another example, a capacitive inventory sensor includes a track configured for retaining items, where the track includes a pusher that is configured to move along the track and to push the items toward the front portion of the track as items are removed from the track. A stationary first conducting plate is positioned along a length of the track, and a stationary second conducting plate is also positioned along a length of the track. A moveable third conducting plate is connected to the pusher. The face of the third conducting plate is positioned opposite a face of the first conducting plate and a face of the second conducting plate such that the moveable third conducting plate overlaps a portion of the first conducting plate and a portion of the second conducting plate. A capacitance sensor is configured to measure a combined capacitance formed among the first conducting plate, the second conducting plate, and the third conducting plate, wherein the measured capacitance varies based on a position of the pusher along the track.

As a further example, a system for identifying a presence of an item along a transmission line includes a transmission line responsive to one or more items positioned along the transmission line. An impulse generator is configured to transmit an impulse at a known frequency from a first end of the transmission line. A terminator is configured to receive the impulse at a second end of the transmission line. An impulse detector is positioned at the first end of the transmission line, and the presence or absence of an item along the transmission line is determined based upon a signal detected by the impulse detector.

DETAILED DESCRIPTION

Figure 1:
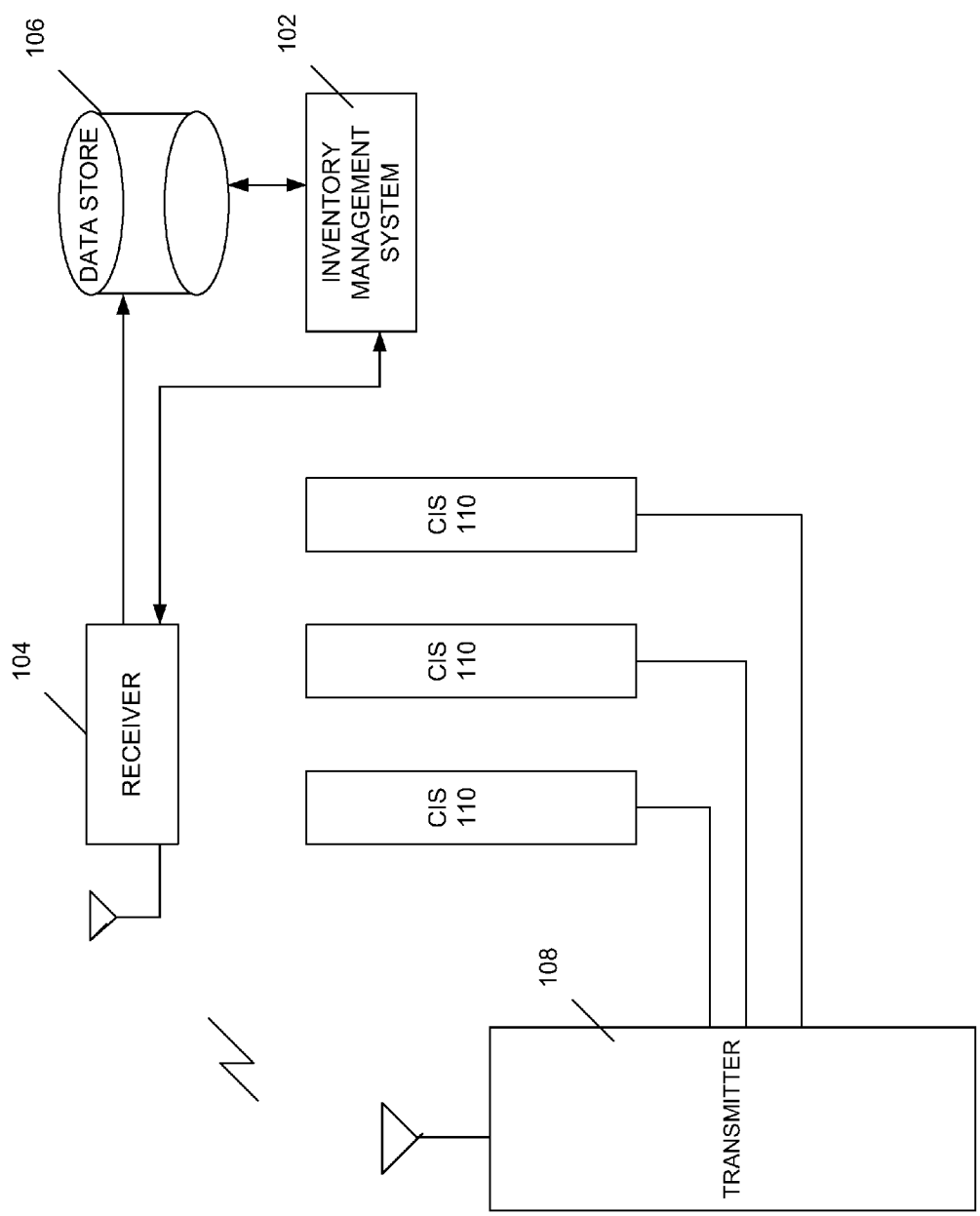
FIG. 1 is a block diagram depicting an environment that includes an inventory management system and capacitive inventory sensors.

FIG. 1 is a block diagram depicting an environment that includes an inventory management system and capacitive inventory sensors. Retailers know that much of the time some fraction of pushers or other inventory holders are depleted or void of product and that this results in a shortfall in sales compared to what would have been possible with more ample stock. Some fraction of the empty pushers is due to the fact that re-stocking personnel are unaware of the fact that the pushers are empty. Often, facilities upstream in the distribution system—and even neighboring facilities in the same chain—have plenty of product but no awareness that a given store is void or nearly void. It is commonly estimated that out-of-stocks (OOS) average around 10%, and fast-moving high-profile products suffer most. When a customer encounters out-of-stock conditions on a key item, not only do sales of that item suffer, many times the customer will shop elsewhere for that item, so sales of other items the customer would have bought in the original store are also lost. If OOS conditions occur too frequently, store loyalty may erode.

In the absence of more timely, granular information about low-stock status, many retailers have minimized OOS probability by overstocking. This needlessly ties up valuable working capital, stocking space, shelf space, and employee hours for over-inventory management. In cases where product shelf life is short, overstocking results in expensive returns or deep consumer discounts to incentivize quick sale. Extra facings of a single product come at the expense of inventory variety that could otherwise appeal to additional customers or potentially out-sell the marginal stock of the original brand.

Promotional or seasonal periods exacerbate the delicate balance between out-of-stocks and over-stocks. A successful promotion can double or triple sales within a store. Some retailers resort to secondary locations during a peak or promoted season. This can improve sales by allowing impulse purchases; however it can also depress sales if retailers are unaware that the "home" location for a product is low or empty and transfer inventory from the secondary location to the place customers usually go to find the product. Because promoted and seasonal products make up a sizeable portion of retailer sales and profits, the concept of "right-sized" inventory is elusive and transient.

Lost sales due to out-of-stocks are estimated in billions of dollars annually. In fast-moving categories where consumers typically purchase multiples of a given item, having only one item on the shelf is almost as consequential. When low-stock and over-stock situations are factored in, the economic motivation to address replenishment deficiencies more efficiently and immediately soars. A means to automatically alert responsive personnel within and beyond the store has been unavailable due to expense and lack of reliability. Many methods that have been attempted also negatively impact the shopping experience or the ease of restocking. To be effective, stock-monitoring mechanisms can should be inexpensive, rugged, easy to retrofit to existing installations, unobtrusive, extensible to a variety of stock-monitoring conditions, reliable/accurate, and easy to integrate into the end users existing IT infrastructure.

With reference to FIG. 1, an inventory management system 102 is in communication with a receiver 104 and a data store 106 for managing and receiving data about inventory distributed throughout an environment. For example, the inventory may be distributed throughout a factory, a distribution center, a store, or a single serving distribution machine. Based on the data received by the inventory management system 102 from the receiver 104 and the data store 106, the inventory management system 102 may perform certain actions to maintain sufficient levels of inventory throughout the environment. For example, when the inventory management system 102 receives data that indicates that an inventory level at a particular location in the environment has run out or is running low on product, an alert can be issued that instructs and employee to restock the particular location. The inventory management system 102 may also receive data that indicates that the environment is running low on product and that more should be ordered. Such a decision to order more product may be based on an amount of product detected, an ordering threshold, an expected rate of product transfer/sales, a detected rate of product transfer/sales, etc.

The data store 106 for storing amounts of product detected and the inventory management system 102 for making inventory management decisions based on amounts of product detected are responsive to the receiver 104, which is configured to wirelessly communicate with a transmitter 108. The transmitter is responsive to a plurality of capacitive inventory sensors (CIS) 110 that are configured to detect an amount of product present in an area based on a capacitance measurement. For example, a capacitor may be implemented such that the capacitance between its constituent plates varies based on an amount of weight placed on top of the capacitor. In another configuration, one plate of a capacitor may be placed on a pusher with another one or more stationary plates being positioned along the length of the track, where the capacitance among the plates varies based on an overlap between the stationary plates and the pusher plate.

Each of the capacitive inventory sensors 110 includes a capacitance measurement device and a capacitor in some form. The capacitor has a base capacitance when an associated shelf or storage area is empty. That capacitance changes when items are added or removed. In one example, the capacitance changes in a linear fashion as items are added and removed. The capacitance measurement device may take the form of a capacitive sensor module (CSM), such as ones commonly utilized in MP3 players, smart phones, computer pads, computer displays, and lab test equipment. A capacitive sensor module detects when a finger, tap pen, or other items are touched to a section of a screen. A capacitive sensor module can be programmed to detect the change in capacitance above a threshold level. When a threshold is exceeded, the module activates, sending a signal (e.g., a signal indicating the presence of absence of items). In another implementation, a micro-controller with an analog to digital converter (e.g., a 10-bit A/D converter), can be used to detect changes in capacitance with more granularity than the on-off detection provided by the capacitive sensor module.

The selection of the capacitor configuration to use for a particular product or location may be based on a number of factors. While pushers work well with many products, there are also several instances where it is desirable to monitor the presence or absence of shelf stock when there are no pusher paddles present. It is common, for example, to find single-serve beverages or other items in a retail cooler that rely on gravity to pull them along a track or to the front of a shelf for easy consumer access. In such cases, adding a pusher paddle may be prohibitively expensive or unreliable, as tracks often become sticky from product spills. Ease of restocking has also been found to be impeded, in some cases, by the presence of pusher paddles. Lastly, there are many areas of a retail environment that do not utilize pusher paddles due to awkward product size or unmet sales volume criteria that would justify their use. It is also common for a given consumer product to be located in several places throughout a store. While one or more of those locations may have pusher paddles associated with them, it is often the case that not all locations of a given product have pusher paddles. Not only may it be important to note the stocking level of each location, it may often be desirable to know the particular location that is selling the most or least of a given item so allocated retail space can be adjusted to derive more sales within a given area or department.

Figure 2:
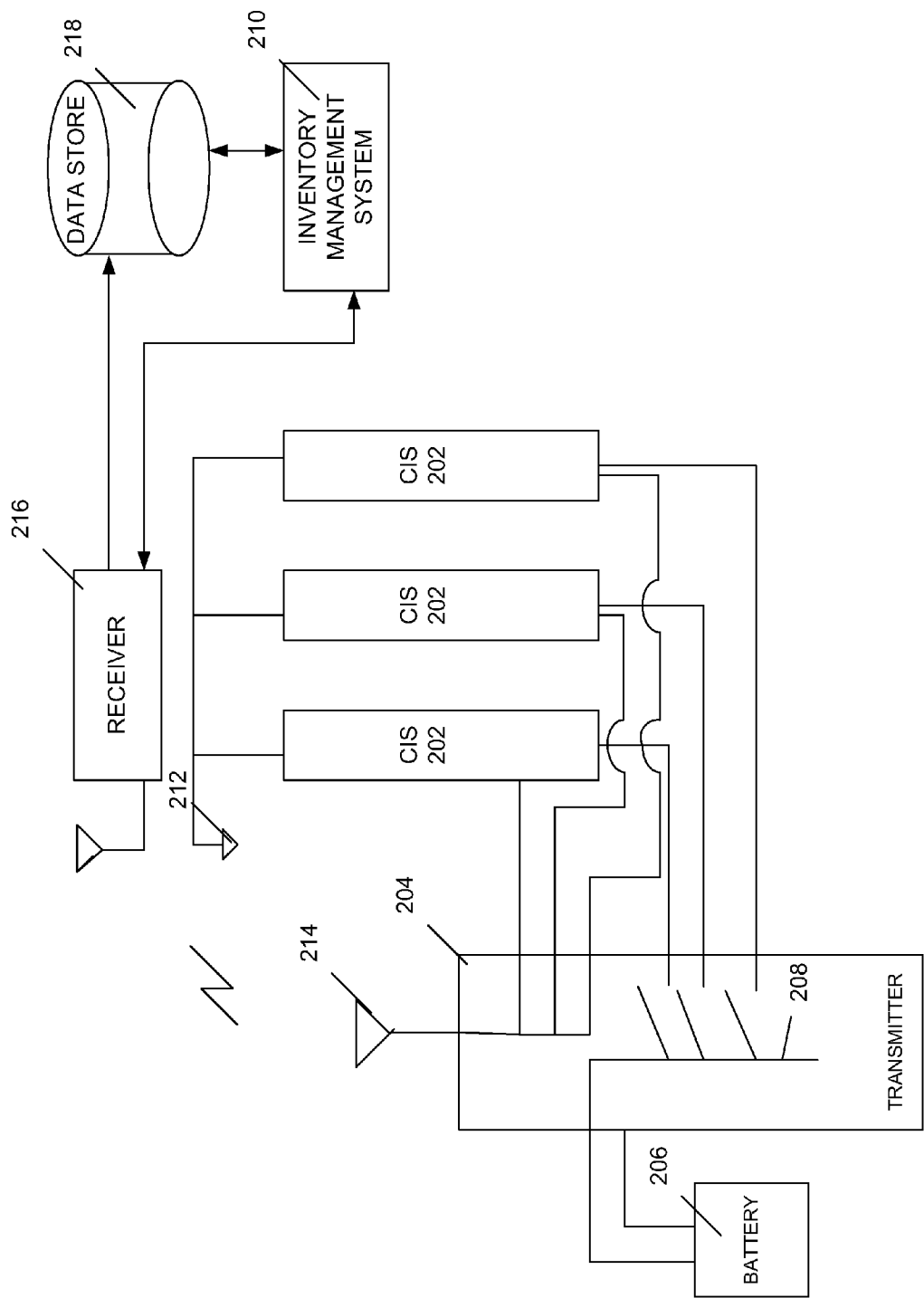
FIG. 2 is a block diagram depicting an example environment for tracking product inventory using capacitive inventory sensors activated by a switch at a transmitter.

FIG. 2 is a block diagram depicting an example environment for tracking product inventory using capacitive inventory sensors activated by a switch at a transmitter. A plurality of capacitive inventory sensors 202 are responsive to a transmitter 204 that selectively provides power to the capacitive inventory sensors 202 from a battery 206 via a switch 208. In response to a command (e.g., from the inventory management system 210, in response to a processor at the transmitter 204, from a clock signal), a voltage measurement is taken to determine a capacitance of one of the capacitive inventory sensors 202. The measured voltage, indicative of a capacitance at one of the capacitive inventory sensors 202 and thus indicative of the amount of product present at the capacitive inventory sensor 202 of interest, is transmitted via the antenna 214 of the transmitter 204 to the receiver 216, where such data is forwarded to the inventory management system 210 and the data store 218. The capacitive inventory sensors 202 may be individually connected to the antenna, or the sensors 202 may be connected to the antenna via a serial communication line, where sensors 202 that are currently not powered via the switch 208 are in a high impedance state and will not interfere with the currently powered sensor 202.

Figure 3:
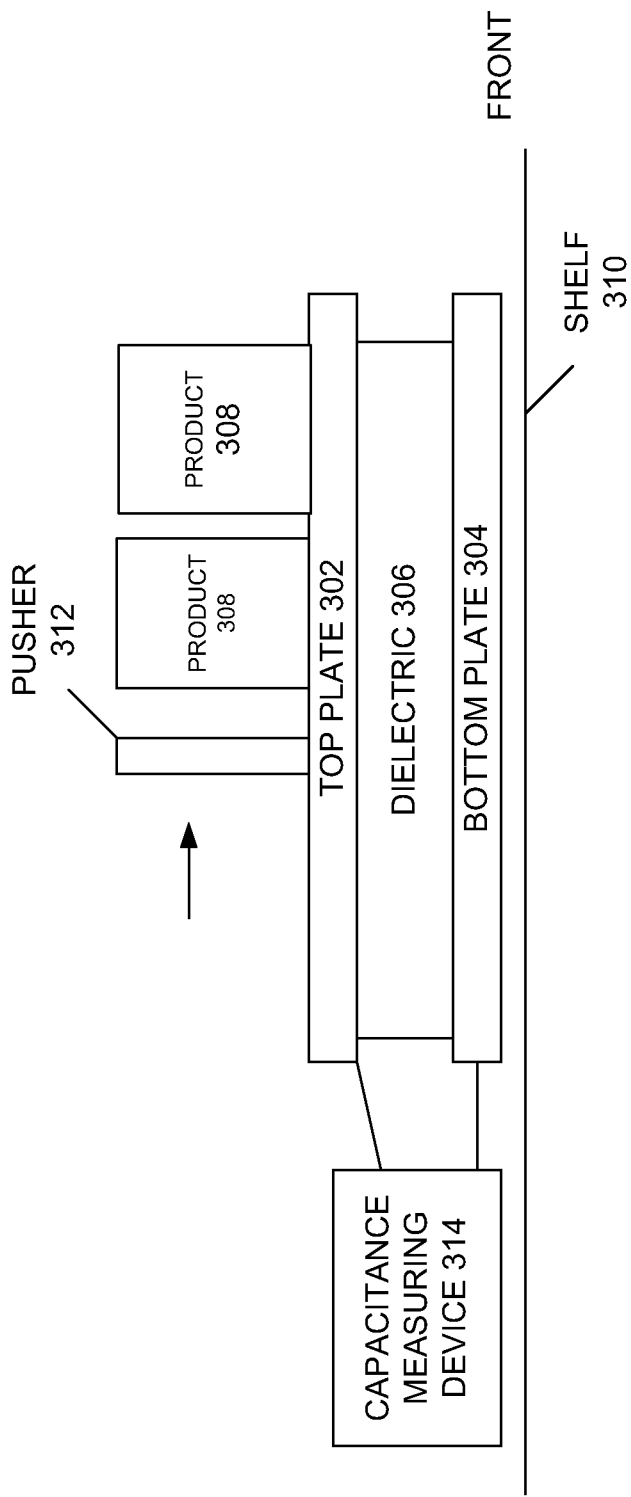
FIG. 3 depicts a side view of an example configuration of a capacitive inventory sensor.

FIG. 3 depicts a side view of an example configuration of a capacitive inventory sensor that includes a pusher. The capacitive inventory sensor includes a capacitor that is formed from a top plate 302, a bottom plate 304, and a dielectric layer 306, which could be formed from air or another dielectric material. Units of product 308 are positioned on top of the top plate 302 and are forced toward a front portion of the capacitive inventory sensor on a shelf 310 by a pusher 312. A capacitance measuring device 314 is connected to the top plate 302 and the bottom plate 304 to measure the capacitance formed by the top plate 302, bottom plate 304, and dielectric 306. The capacitance varies based on an amount of product 308 that is placed upon the top plate 302, as certain characteristics of the capacitor 302, 304, 306 vary based upon weight being positioned on top of the top plate 302 (e.g., the distance between the top plate 302 and bottom plate 304 may decrease as more weight is added). The capacitance varies in a predictable way, such that an amount of product 308 positioned on top of the top plate 302 can be determined based on the magnitude of the capacitance change. Such data is forwarded by the capacitance measuring device 314 to the inventory management system and data store for consideration and appropriate action.

Figure 4:
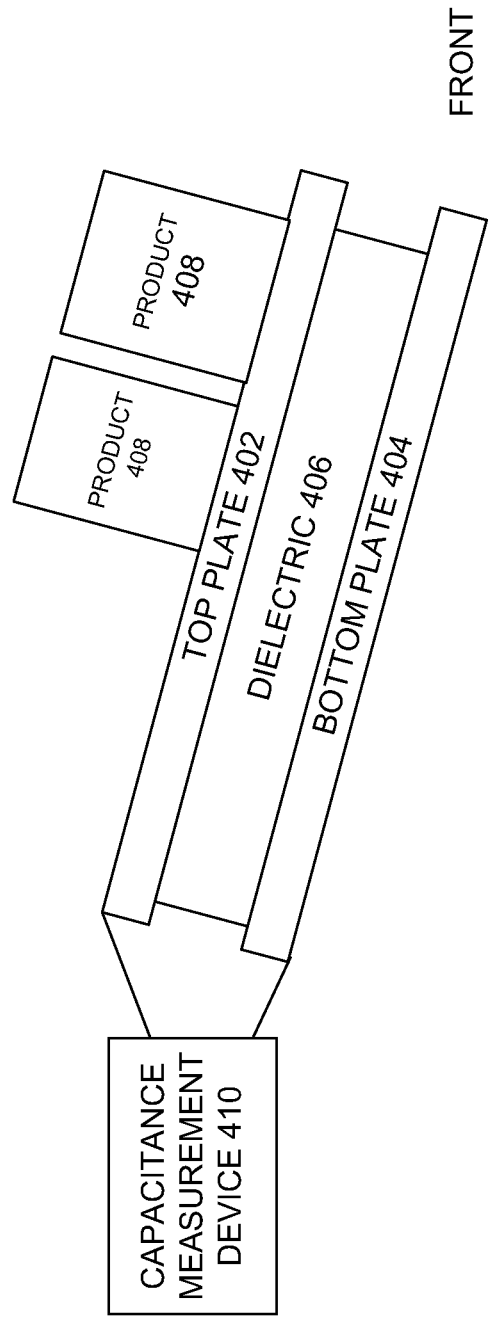
FIG. 4 depicts a side view of an example configuration of a capacitive inventory sensor that does not include a pusher.

FIG. 4 depicts a side view of an example configuration of a capacitive inventory sensor that does not include a pusher. The capacitive inventory sensor includes a capacitor that is formed from a top plate 402, a bottom plate 404, and a dielectric layer 406. Units of product 408 are positioned on top of the top plate 402 and are forced toward a front portion of the capacitive inventory sensor by gravity based on the forward tilt of the top plate 402. A capacitance measuring device 414 is connected to the top plate 402 and the bottom plate 404 to measure the capacitance formed by the top plate 402, bottom plate 404, and dielectric 406. The capacitance varies based on an amount of product 408 that is placed upon the top plate 402, as certain characteristics of the capacitor 402, 404, 406 vary based upon weight being positioned on top of the top plate 402 (e.g., the distance between the top plate 402 and bottom plate 404 may decrease as more weight is added). Data is forwarded by the capacitance measuring device 410 to the inventory management system and data store for consideration and appropriate action.

Figure 5:
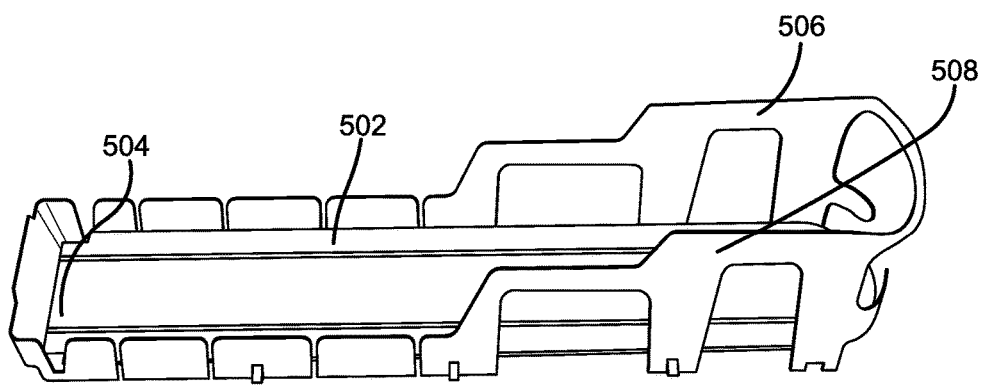
FIG. 5 depicts an example capacitive inventory sensor.

FIG. 5 depicts an example capacitive inventory sensor. The example capacitive inventory sensor is configured for holding plastic or glass bottles. The capacitive inventory sensor includes a top plate 502 on which the bottles are placed. As bottles are placed on the top plate 502, the capacitance formed by the top plate 502 and a bottom plate positioned under the top plate 502 changes. A capacitance measuring device may be connected at a back portion 504 of the capacitive inventory sensor. The capacitive inventory sensor may be place on an incline, such as on a shelf in a convenience or grocery store cooler or within a single serving food/beverage machine (e.g., a pop machine) so that bottles placed on the capacitive inventory sensor will tend to slide toward a front portion 506 of the capacitive inventory sensor. Molding 508 (e.g., plastic, metal, composite) may be incorporated with the capacitive inventory sensor to hold the bottles within the capacitive inventory sensor on the top plate 502.

Figure 6:
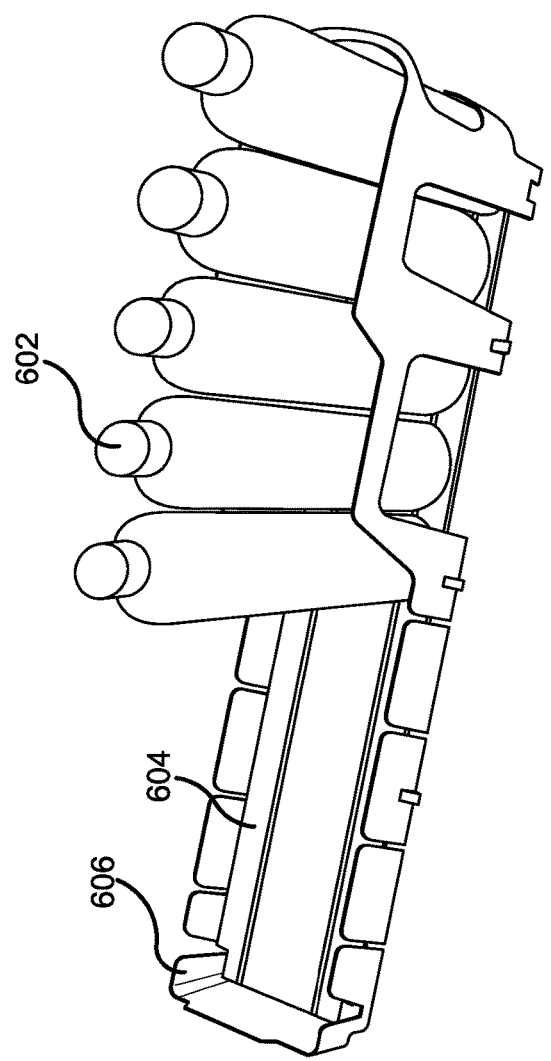
FIG. 6 depicts an example capacitive inventory sensor with bottles loaded onto the sensor.

FIG. 6 depicts an example capacitive inventory sensor with bottles loaded onto the sensor. In the example of FIG. 6, a number of bottles 602 are loaded into the capacitive inventory sensor on top of a top plate 604 that forms a capacitor with a bottom plate. A capacitance measuring device is connected at a back portion 606 of the capacitive inventory sensor. Based on the capacitance measured, an inventory management system may be able to sense whether any product is present on the displayed capacitive inventory sensor and may further be able to tell a number of units of product that are on the displayed capacitive inventory sensor. Stocking and reordering operations may then be commanded accordingly.

Figure 7:
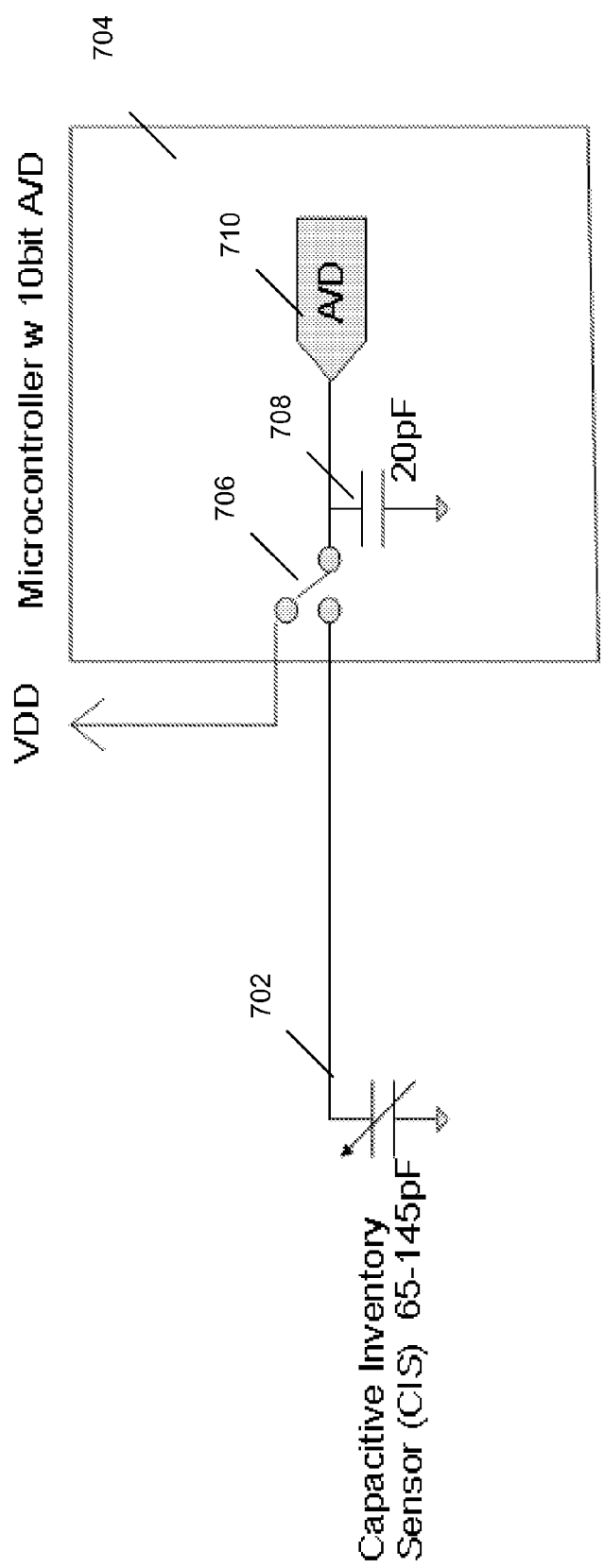
FIG. 7 is a circuit diagram depicting an example configuration for a capacitive inventory sensor.

FIG. 7 is a circuit diagram depicting an example configuration for a capacitive inventory sensor. The capacitive inventory sensor 702 includes a capacitor 702 whose capacitance varies based on a condition. For example, the capacitance may vary as weight is added on top of one of the plates of the capacitor 702 as described above. As a further example, the capacitance may vary based on a position of one of the plates of the capacitor 702, as will be described in further detail herein below. The capacitance of the capacitor 702 is measured via a microcontroller with a 10 bit A/D converter 704. To perform such a measurement, the microcontroller 704 uses a switch 706 to charge a sample and hold capacitor 708 to a voltage, $V_{DD}$. The switch then transitions to a second position, connecting the capacitive inventory sensor 702 in parallel with the sample and hold capacitor 708, distributing the charge between the sample and hold capacitor 708 and the capacitive inventory sensor 702. The voltage then present at the A/D converter 710 is representative of the capacitance of the capacitive inventory sensor 702, where a larger value of capacitance of the capacitive inventory sensor 702 will result in a lower voltage sensed at the A/D converter 710.

The voltage measured by the A/D converter 710 is related to the capacitance of the capacitive inventory sensor 702 according to the following formula:

$$V_{CIS}=(C_r*V_{DD})/(C_{CIS}+C_r),$$

where $V_{CIS}$ is the voltage of the capacitive inventory sensor 702 measured by the A/D converter 710, $C_r$ is the capacitance of the internal sample and hold capacitor and any add-on capacitors (none included in FIG. 7), $V_{DD}$ is the voltage used to charge the sample and hold capacitor 708, and $C_{CIS}$ is the capacitance of the capacitive inventory sensor 702.

Figure 8:
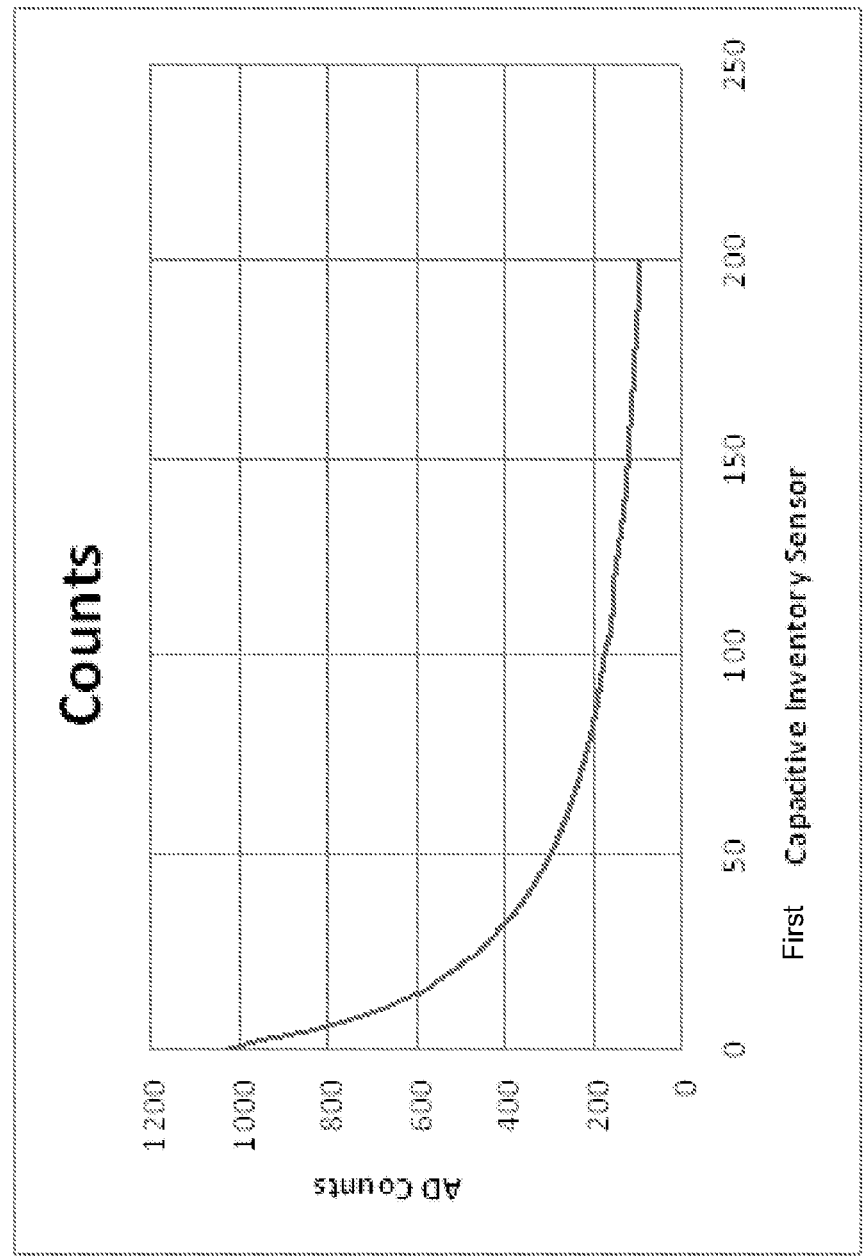
FIG. 8 is a graph depicting an example relationship between an A/D converter range and a first capacitive inventory sensor.

FIG. 8 is a graph depicting an example relationship between an A/D converter's range and a first capacitive inventory sensor constructed similarly to the example of FIG. 7. In the present example, the effective range of the capacitive inventory sensor is between 65 pF when empty up to 145 pF when full. This range of capacitances is low on the A/D converter scale, which could result in difficulty in discerning the number of items present because the range of operation of the capacitive inventory sensor uses such a small portion of the A/D converter range. It may be desirable shift the response curve to the right, such that a more dynamic range of A/D converter values is present in the 65 pF-145 pF range.

Figure 9:
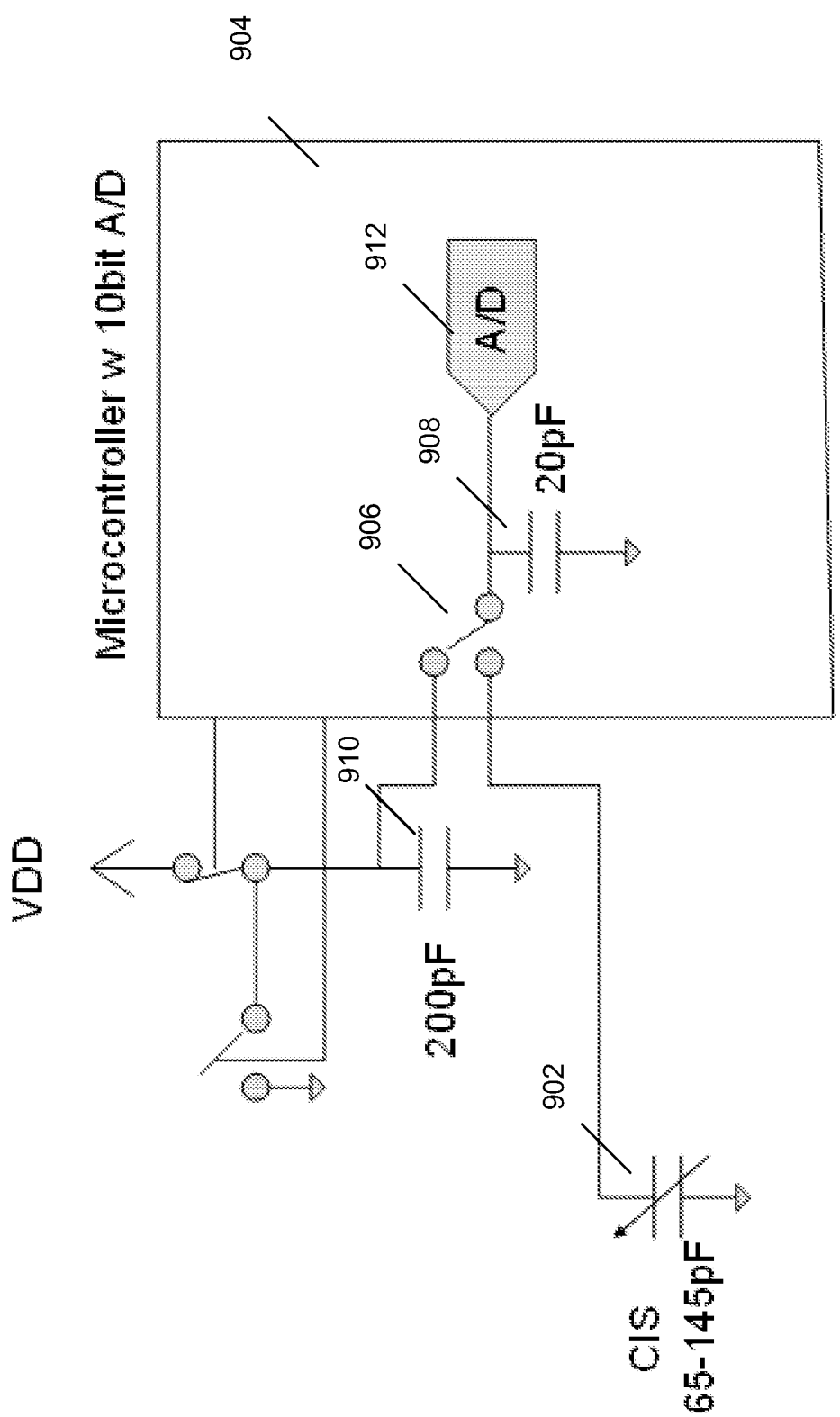
FIG. 9 is a circuit diagram depicting an example configuration for a capacitive inventory sensor that includes an add-on capacitor.

Such shifting can be accomplished in a variety of ways, such as by incorporating an add-on capacitor in parallel with the sample and hold capacitor. FIG. 9 is a circuit diagram depicting an example configuration for a capacitive inventory sensor that includes an add-on capacitor. The capacitive inventory sensor 902 includes a capacitor 902 whose capacitance varies based on a condition. The capacitance of the capacitor 902 is measured via a microcontroller with a 10 bit A/D converter 904. To perform such a measurement, the microcontroller 904 uses a switch 906 to charge a sample and hold capacitor 908 and an add-on capacitor 910 to a voltage, $V_{DD}$. The switch then transitions to a second position, connecting the capacitive inventory sensor 902 in parallel with the sample and hold capacitor 908, distributing the charge between the sample and hold capacitor 908 and the capacitive inventory sensor 902. The voltage then present at the A/D converter 912 is representative of the capacitance of the capacitive inventory sensor 902, where a larger value of capacitance of the capacitive inventory sensor 902 will result in a lower voltage sensed at the A/D converter 912. The presence of the add-on capacitor 910 shifts the relationship shown in FIG. 8 to the right according to the relationship of the formula described above with respect to FIG. 7.

Figure 10:
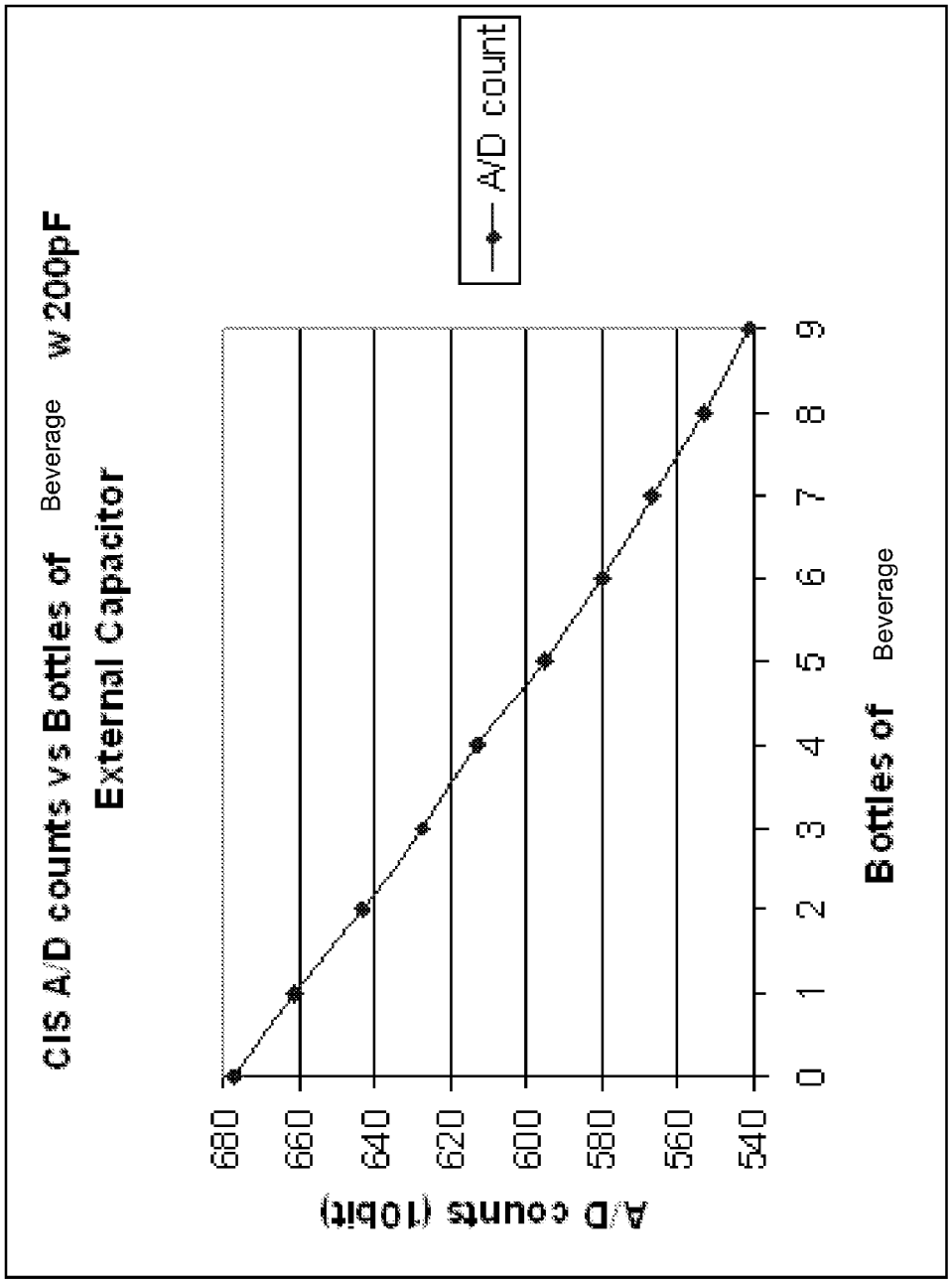
FIG. 10 is a graph depicting an example relationship between A/D converter values and a number of bottles of beverage present on a capacitive inventory sensor.

FIG. 10 is a graph depicting an example relationship between A/D converter values and a number of bottles of beverage present on a capacitive inventory sensor. The A/D converter 912 measures a voltage that varies according to the capacitance of the capacitive inventory sensor 902. That capacitance varies in a predictable manner based on a condition, such as the number of bottles of beverage of a known weight present on one plate of the capacitive inventory sensor 902. That relationship can be used to analytically or experimentally develop the graph of FIG. 10, which maps voltages measured by the A/D converter 912 to an amount of product present at the capacitive inventory sensor 902. Amounts of product or changes in the amounts of product can be transmitted to an inventory management system, which can analyze the values to provide data displays or make appropriate stocking/reordering decisions accordingly.

Other variations may also be made in a capacitive inventory sensor circuit. In one example, the capacitive inventory sensor may be designed so achieve a linear response to a change in capacitance versus the change in the number of items counted by the capacitive inventory sensor. The capacitive inventory sensor may be buffered from neighboring sensors so that a minimal reaction to items present at neighboring sensors is detected by the capacitive inventory sensor. It may further be desirable to shield the capacitive inventory sensor from an expected environment such as to compensate for metal shelving, radio frequency interference, etc.

Figure 11:
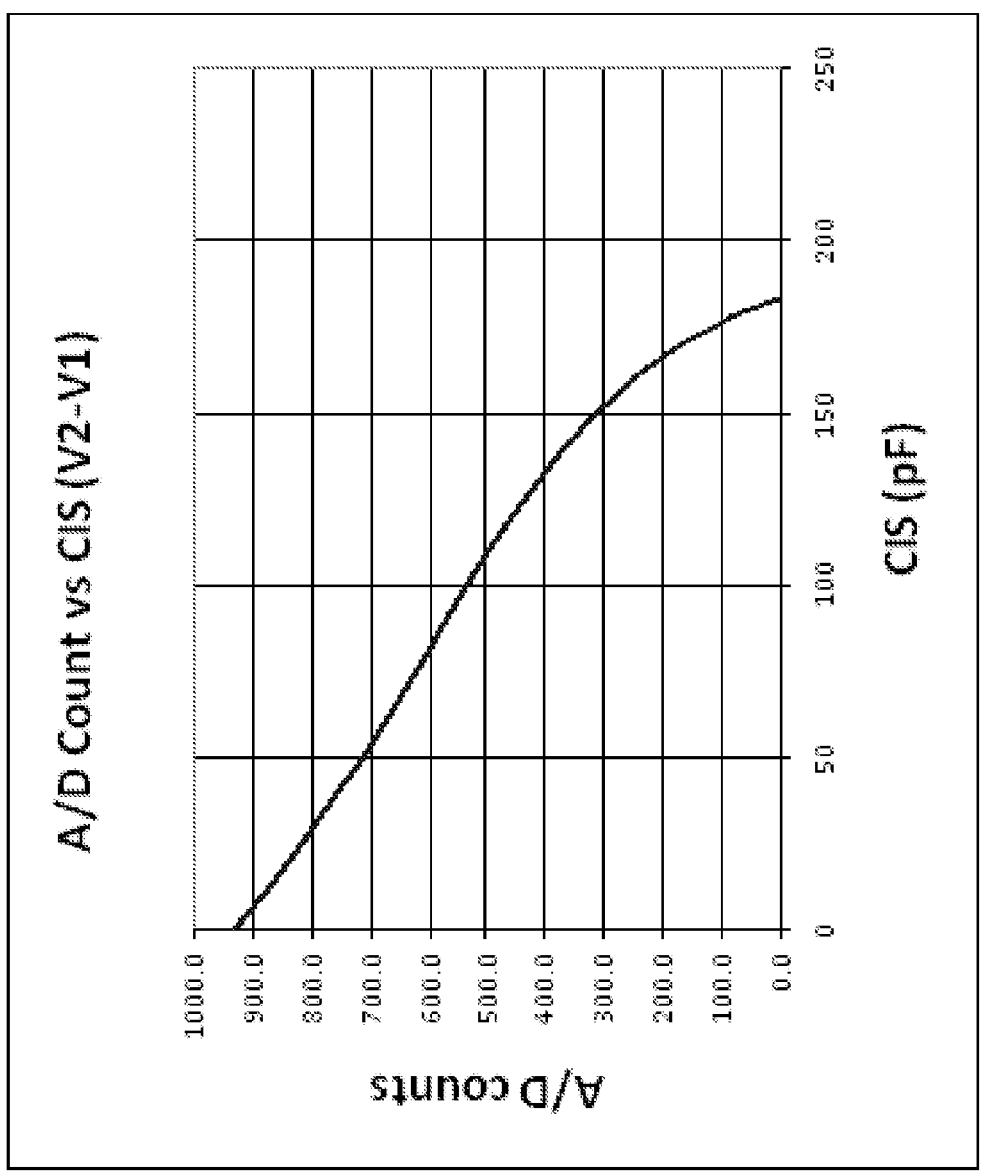
FIG. 11 is a graph depicting a relationship between an A/D converter range and capacitance values of a capacitive inventory sensor that could be achieved using a differential sampling technique.
Figure 12:
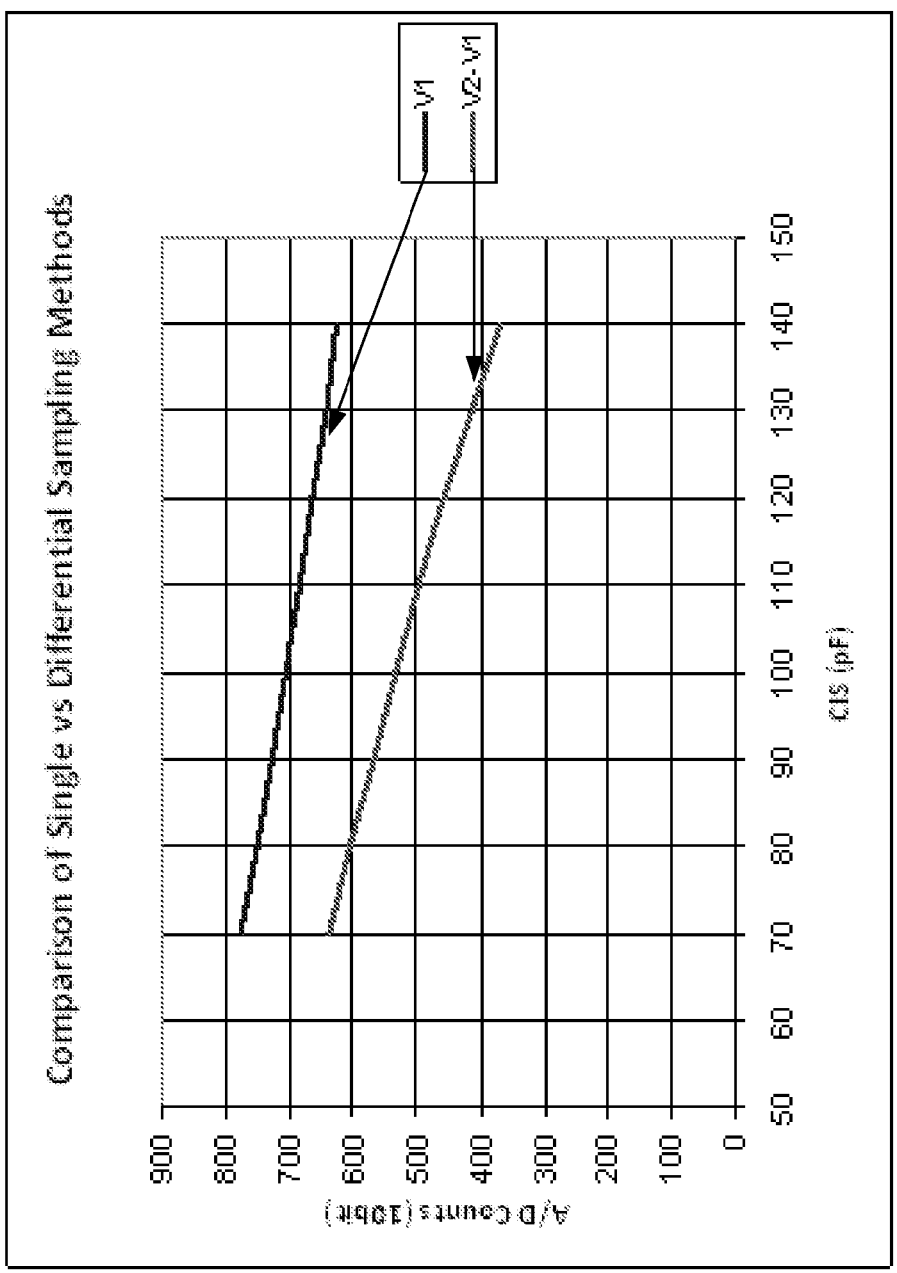
FIG. 12 is a graph depicting a sample advantage that could be realized using the differential sampling technique.

FIG. 11 is a graph depicting a relationship between an A/D converter range and capacitance values of a capacitive inventory sensor that could be achieved using a differential sampling technique. This approach repeats the steps described above, where a filtered value is acquired and stored for final calculations. This voltage sample is defined as V1. The process is then reversed, where the capacitive inventory capacitor is fully charged and the sample and hold or reference capacitor is fully discharged. The reference capacitor is enabled and connected to the fully charged capacitive inventory sensor, resulting in another voltage to be sampled by the A/D converter. This voltage is defined as V2. The final value is determined by computing the delta of the two samples (V2−V1). A graph of this technique is plotted in FIG. 11. FIG. 12 is a graph depicting a sample advantage that could be realized using the differential sampling technique. As shown in FIG. 12, the differential sampling technique enables use of a broader portion of the A/D converter range through the effective range of the capacitive inventory sensor capacitance value, as indicated by the steeper slope of the differential sampling technique plot. This steeper slope translates to an increase in resolution and accuracy of the capacitive inventory sensor.

In one example, the capacitive inventory sensor used for this data has a sensor section comprising two plates of a capacitor running down a middle portion of the sensor along the length of the sensor. The middle portion width dimension is 1.5". Ground plates are positioned on each side of the sensor separated by ⅛" gap. A low cost micro-controller is positioned on the back section of the capacitive inventory sensor. Other components may include the external add-on capacitor and an interface connector. Several of these capacitive inventory sensors can be connected to a central collector which will control when each sensor is powered up. Data can be collected and transmitted wirelessly (or in a wired fashion) to a common node. The node will periodically transmit the data to the inventory management system data servers for analysis and report generation. A capacitive inventory sensor can be manufactured using a variety of materials, such as low cost plastic. The conductive grounds and sensor section can be made by accurately spraying conductive paint. Other materials could include flex circuit or even cardboard.

Figure 13:
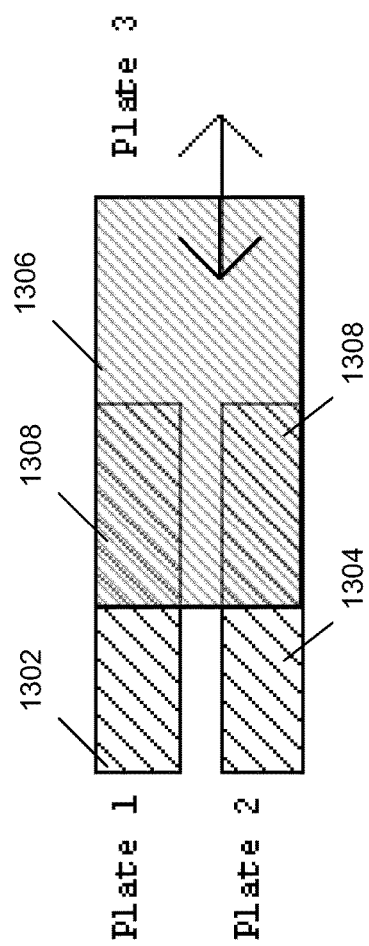
FIG. 13 depicts an alternative form for a capacitive inventory sensor that utilizes a moveable capacitor plate.

FIG. 13 depicts an alternative form for a capacitive inventory sensor that utilizes a moveable capacitor plate. The capacitor inventory sensor is formed using three parallel plates. Two of the plates 1302, 1304 are fixed and stationary. The third plate 1306 is moveable, and may be connected to a moveable member in a capacitive inventory sensor, such as on a pusher. As indicated in FIG. 13, as the moveable plate 1306 moves, the moveable plate 1306 overlaps differing portions 1308 of the stationary plates 1302, 1304. The differing amounts of overlap result in differing levels of capacitance among the three plates 1302, 1304, 1306. Measurement of such capacitances can indicate the position of the moveable plate 1306, which can indicate the position of an object, such as a pusher, to which the moveable plate 1306 is connected. The pusher position can in turn be translated into an amount of product present in the pusher assembly.

Figure 14:
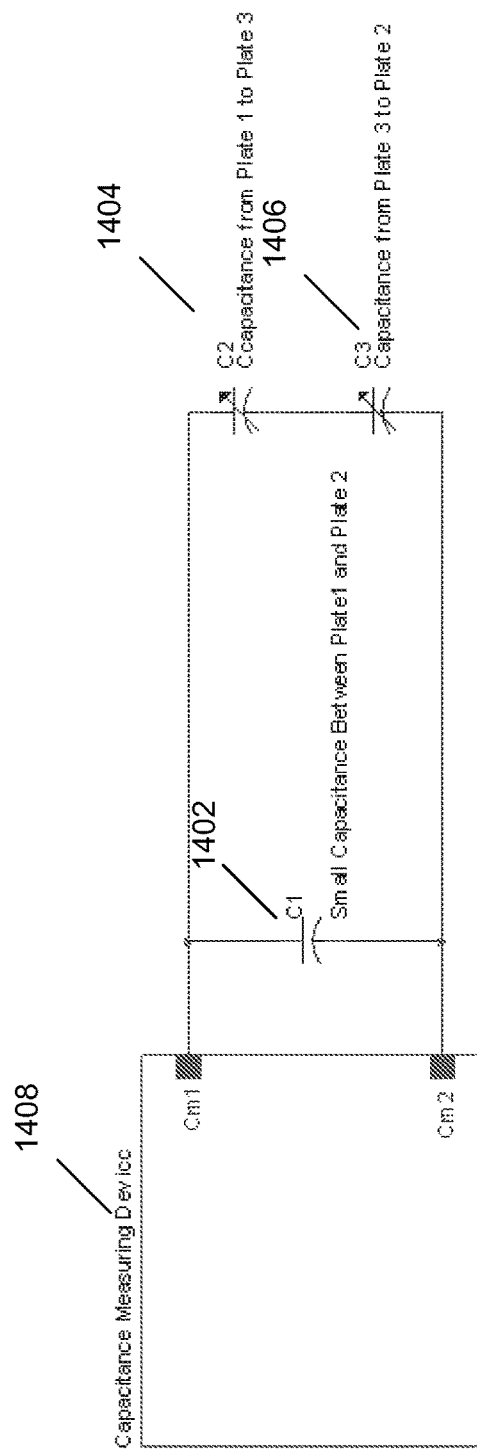
FIG. 14 is a circuit diagram depicting an equivalent circuit to the configuration depicted in FIG. 13.

FIG. 14 is a circuit diagram depicting an equivalent circuit to the configuration depicted in FIG. 13. The two stationary plates can be arranged edge to edge so that the capacitance 1402 between the two stationary plates is small. The moveable plate is positioned opposite the two stationary plates so that a face of the moveable plate is opposite the faces of the two stationary plates. Such a configuration forms two capacitors in series, as shown at 1404, 1406. A capacitance measuring device 1408 is configured to measure the capacitances 1402, 1404, 1406 formed by the three plates.

The configuration shown in FIGS. 13 and 14 enables estimation of the capacitance, $C_2$, between stationary plate 1 and moveable plate 3 according to:

$$C_2 = k * A_1 / d,$$

where k is a constant, $A_1$ is the area of overlap between plates 1 and 3, and d is the distance of separation between stationary plates 1 and 2 and moveable plate 3. Similarly, the capacitance between stationary plate 2 and moveable plate 3 can be estimated as:

$$C_3 = k * A_2 / d,$$

where k is a constant, $A_2$ is the area of overlap between plates 2 and 3, and d is the distance of separation between stationary plates 1 and 2 and moveable plate 3. A position for x=0 (where x is representative of the position of the moveable third plate, and the structure (e.g., the pusher) to which the third plate is attached) can be selected such that:

$$A = a * x,$$

where a is based upon by the widths of the plates and can be determined using a geometric calculation. Such selection results in:

$$C_2 = C_3 = k * a * x / d.$$

Simplifying k*a/d into a single constant m, $$C_2 = C_3 = m * x.$$

Thus, the total capacitance, $C_m$, seen by the measuring device 408 is:

$$C_m = C_1 + m * x / 2.$$

This is an equation of a straight line, where $C_m$ is linearly proportional to the displacement x with a known offset of $C_1$. This equation can be rearranged to identify the position, x as:

$$x = 2(C_m - C_1) / m.$$

Thus, the measured capacitance can be translated into a position estimate.

Figure 15:
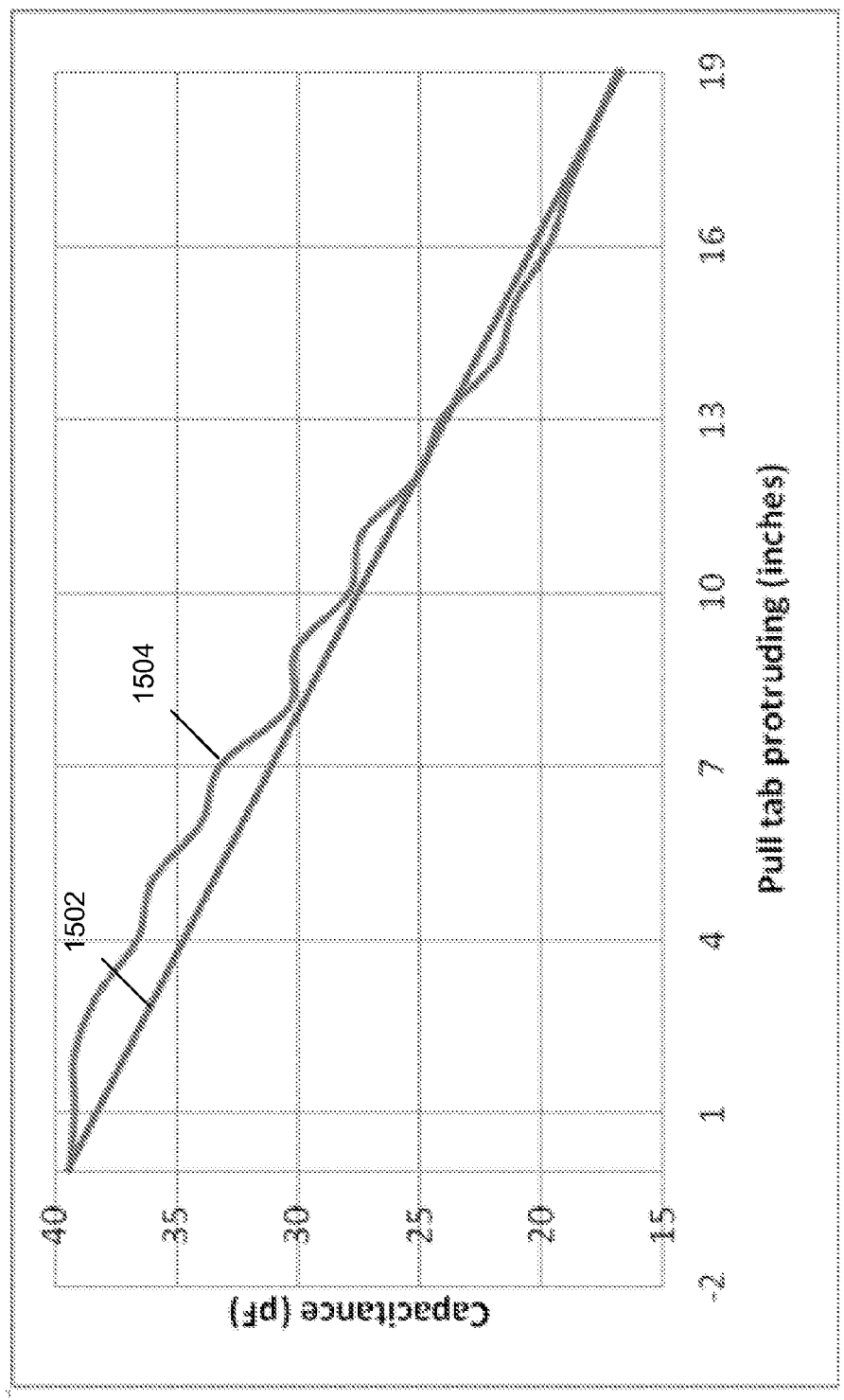
FIG. 15 is a graph depicting an example expected and measured variation in capacitance based on a position of the moveable plate.

FIG. 15 is a graph depicting an example expected and measured variation in capacitance based on a position of the moveable plate. The straight line 1502 is based on the above described linear equation. The non-straight but linearly trending line 1504 is based on actual measurements taken as a moveable third plate was translated with respect to a pair of stationary plates. The real-life measured capacitances 1504 are sufficient for identifying an approximate position of the moveable third plate. This position is related to the position of the structure, such as the pusher, to which the third plate is connected. Knowing the dimensions of product to be positioned in the capacitive inventory sensor, the position of the pusher can be translated to a number of items present in the capacitive inventory sensor.

Figure 16:
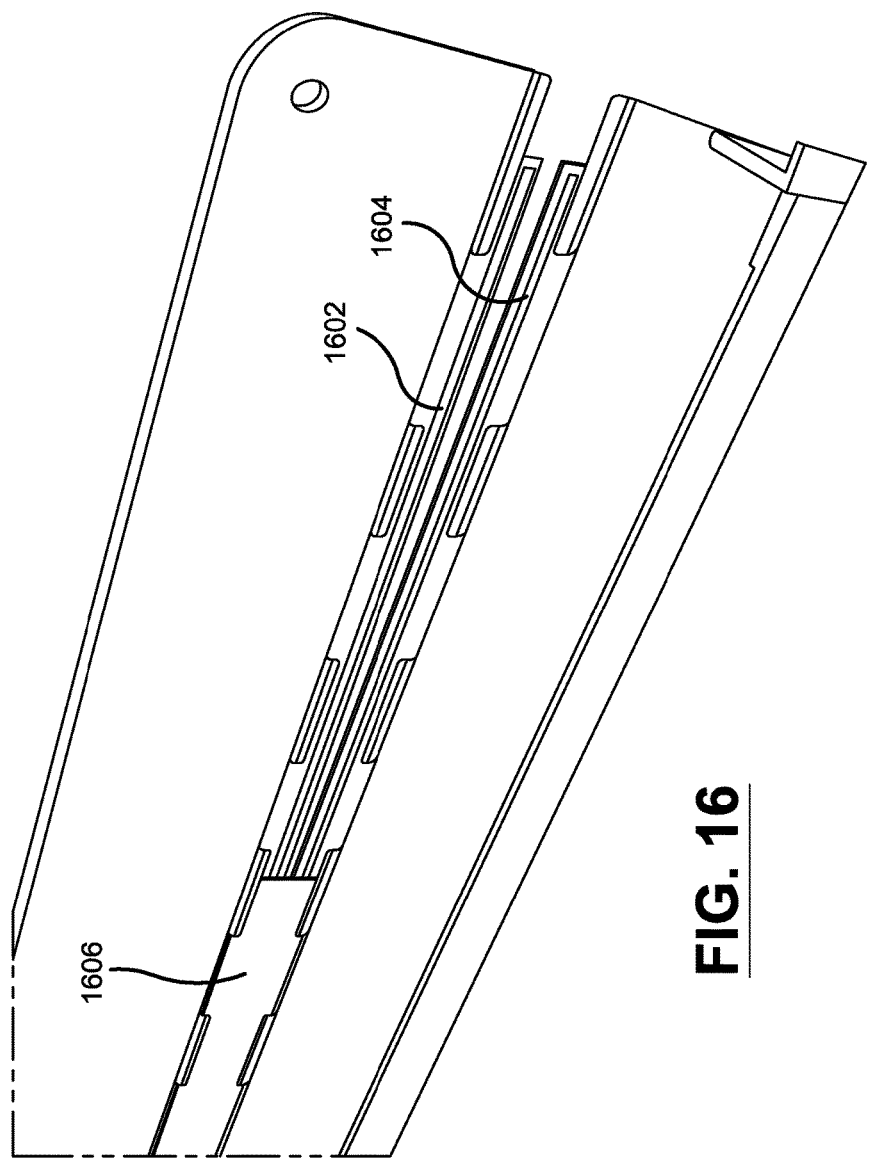
FIG. 16 depicts an example three-plate capacitive inventory sensor.

FIG. 16 depicts an example three-plate capacitive inventory sensor. Two of the plates 1602, 1604 are fixed and stationary. The third plate 1606 is moveable, and may be connected to a moveable member in a capacitive inventory sensor, such as on a pusher. As the moveable plate 1606 moves, the moveable plate 1606 overlaps differing portions of the stationary plates 1602, 1604. The differing amounts of overlap result in differing levels of capacitance among the three plates 1602, 1604, 1606. Measurement of such capacitances can indicate the position of the moveable plate 1606, which can indicate the position of an object, such as a pusher, to which the moveable plate 1606 is connected. The pusher position can in turn be translated into an amount of product present in the pusher assembly.

The measured capacitance is based on the amount of overlap present between the stationary first plate and second plate and the moveable third plate. The amount of overlap among the plates can be varied in several different ways. As depicted in FIG. 13, the amount of overlap can be varied where the moveable third plate extends beyond the length of the stationary first plate and the stationary second plate.

Figure 17:
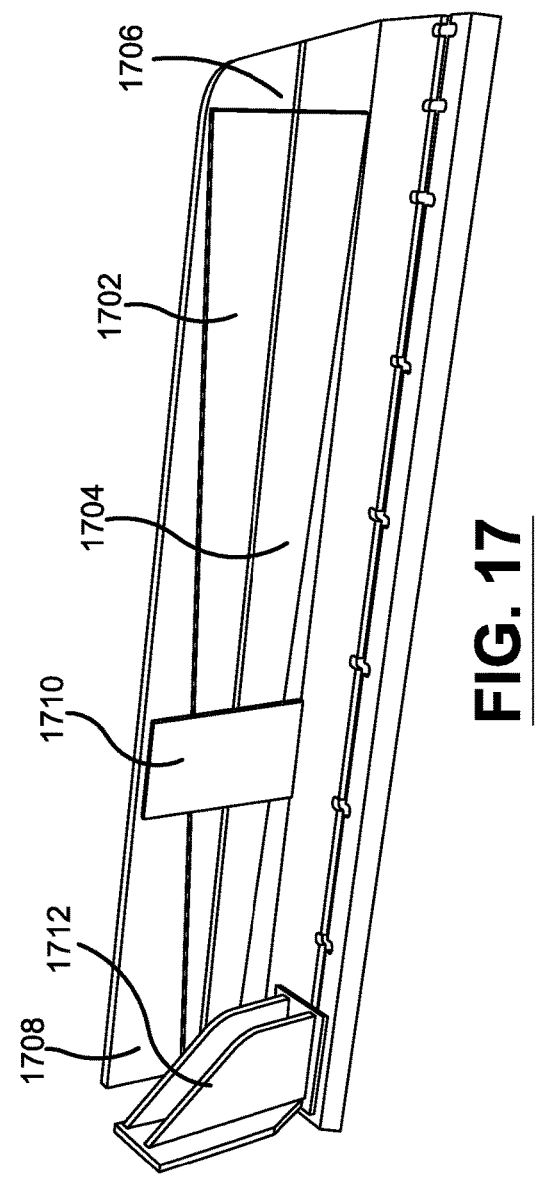
FIG. 17 depicts a configuration where the stationary first plate and second plate extend the length of the capacitive inventory sensor and vary in width along that length.

FIG. 17 depicts a configuration where the stationary first plate and second plate extend the length of the capacitive inventory sensor and vary in width along that length. A stationary first plate 1702 and stationary second plate 1704 are positioned along a length of the capacitive inventory sensor track. The first and second plates 1702, 1704 are largest at a back portion 1706 of the track and taper toward the front portion 1708 of the track. The moveable third plate 1710 is configured to be attached to the pusher 1712, such that the third plate 1710 traverses the length of the track with the pusher 1712. The capacitance between the stationary plates 1702, 1704 and the moveable plate 1710 increases as the third plate 1710 moves toward the back portion 1706 of the track because a larger area of first and second plate conductors is directly opposite the face of the third plate 1710 in the back portion position 1706. By measuring the capacitances among the three plates 1702, 1704, 1710 in a similar manner as described with respect to FIG. 14, a position of the third plate 1710, and thus the pusher 1712 can be determined. The shape of the stationary first and second plates 1702, 1704 could be varied in other ways (e.g., in a stepped fashion, in a curved fashion) to provide different levels of discrimination, to provide greater resolution at a particular portion of the track, etc.

Figure 18:
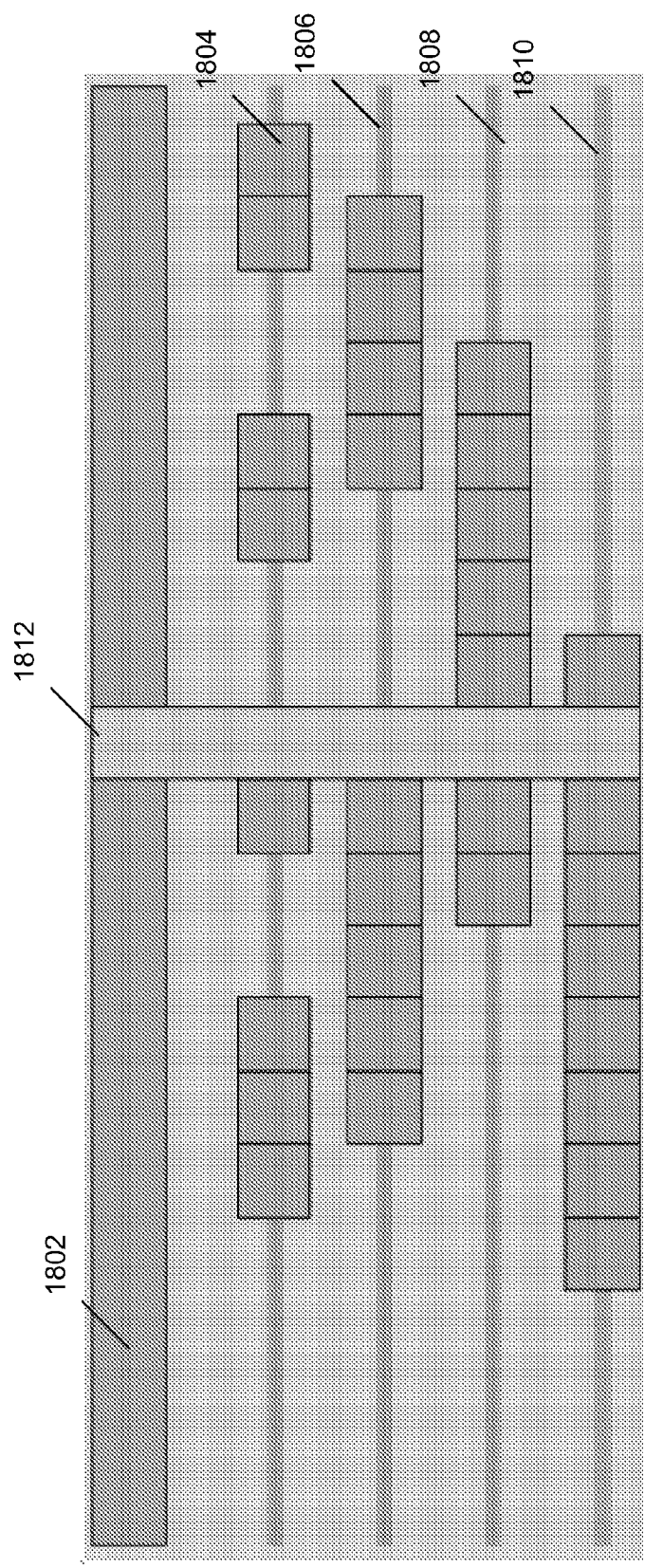
FIG. 18 depicts a coded digital capacitive inventory sensor configuration.

A position of the moveable third plate can also be determined using a digital coding configuration. FIG. 18 depicts a coded digital capacitive inventory sensor configuration. A first stationary plate 1802 is provided at a consistent thickness along the length of a capacitive inventory sensor track. A plurality of additional stationary plates 1804, 1806, 1808, 1810 have varying, stepped widths along the length of the track. A moveable third plate 1812 is configured to move along the length of the track. When the moveable third plate 1812 is positioned opposite a wide portion of one of the additional stationary plates 1804, 1806, 1808, 1810, a capacitance of known magnitude is formed between the moveable third plate and that stationary plate. When the moveable third plate 1812 is positioned opposite a narrow portion of one of the additional stationary plates 1804, 1806, 1808, 1810, a capacitance of smaller magnitude is formed between the moveable third plate and that stationary plate. A capacitance measuring device may be connected among the stationary first plate 1802, the moveable third plate 1812, and each of the additional stationary plates 1804, 1806, 1808, 1810 in sequence, resulting in four capacitance measurements that, in combination, are indicative of the position of the moveable third plate 1812. Based on the on-off indication associated with each of the additional stationary plates 1804, 1806, 1808, 1810, the position of the moveable third plate 1812 can be decoded. In the example of FIG. 18, the wide and narrow portions of the additional stationary plates 1804, 1806, 1808, 1810, are arranged in a Gray code, where only one additional stationary plate 1804, 1806, 1808, 1810 has a bit (portion) that changes in each position along the track. In some configurations, the bits (portions) may be unequally spaced to provide higher resolution at different portions of the track. In an embodiment, a stationary fourth conducting plate is positioned along the length of the track, wherein the third conducting plate is discontinuous along the length of the track, wherein the capacitance sensor further measures a second combined capacitance formed among the first conducting plate, the third conducting plate, and the fourth conducting plate, wherein the position of the pusher is determined based upon the measured capacitance and the measured second capacitance.

Figure 19:
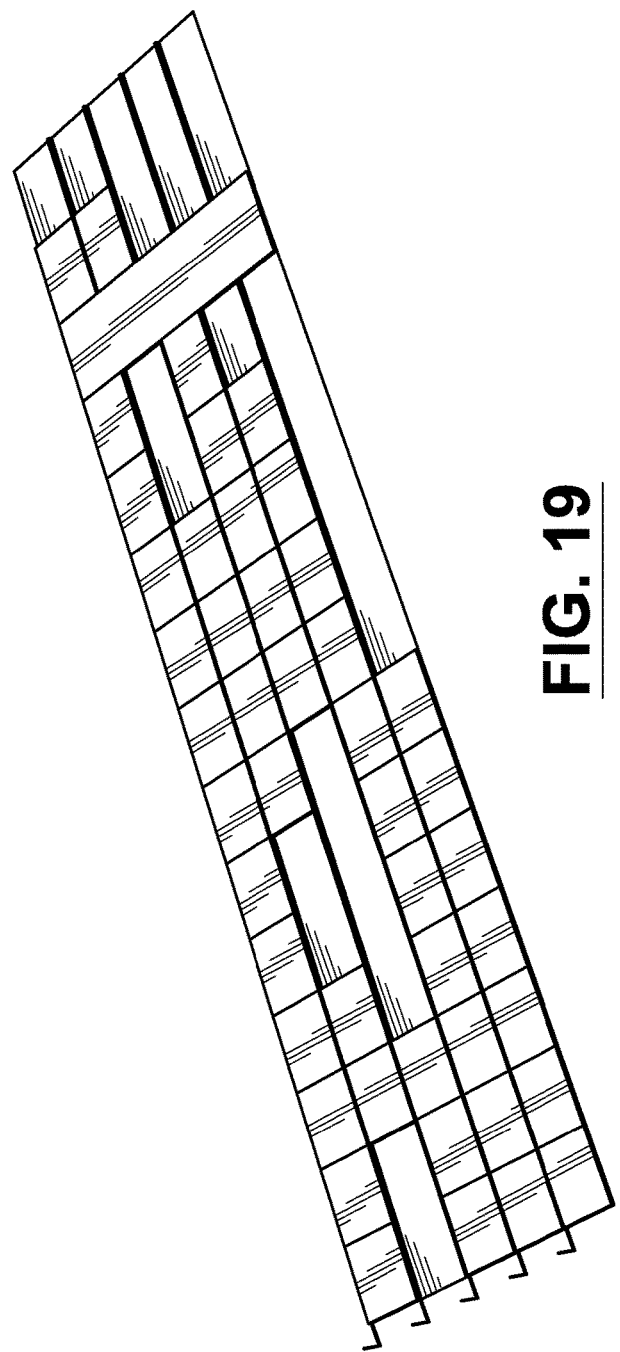
FIG. 19 depicts an example implementation of a coded digital capacitive inventory sensor.
Figure 20:
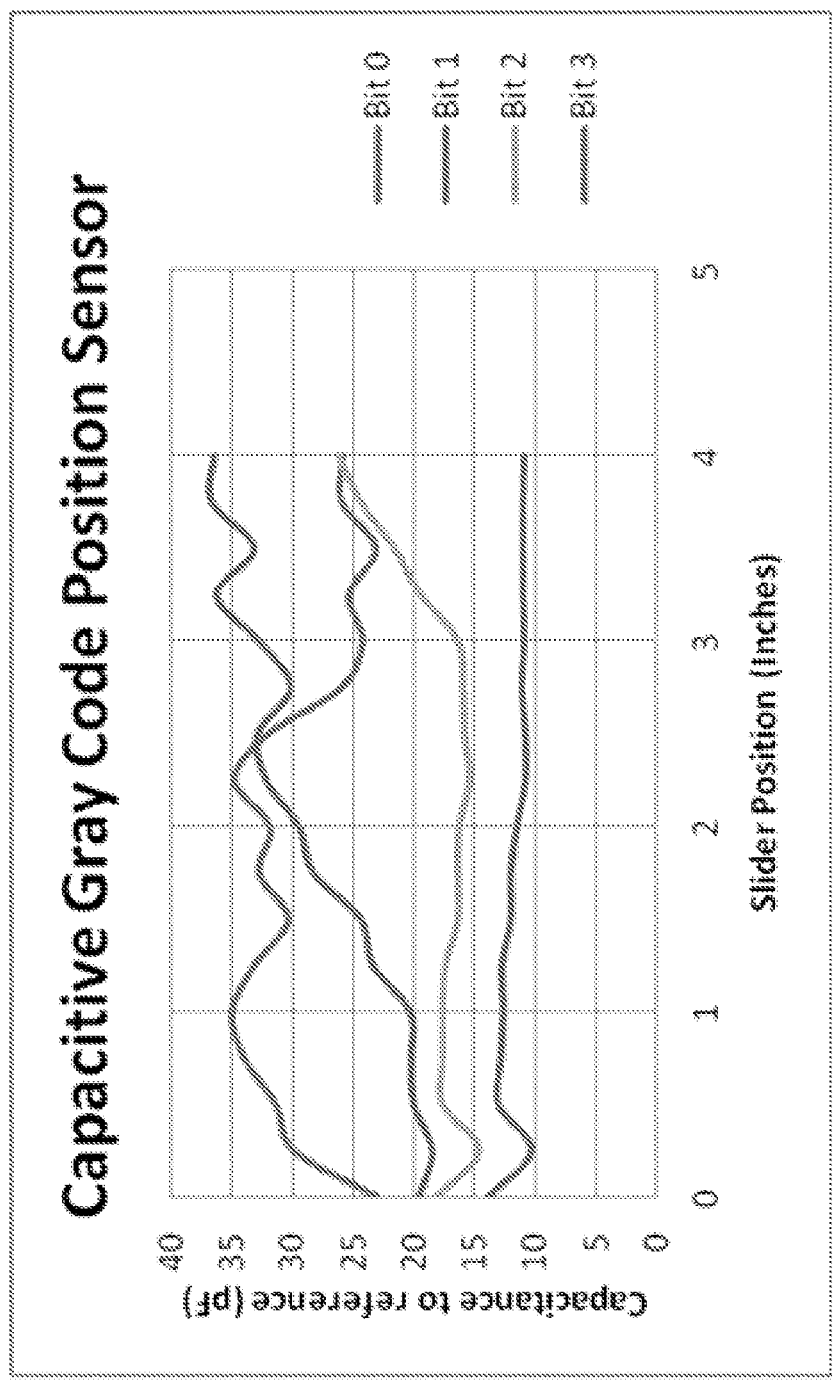
FIG. 20 is a graph depicting measured data over the first four portions in 0.25" increments.

FIG. 19 depicts an example implementation of a coded digital capacitive inventory sensor. The example includes a rectangular piece of single-sided copper-laminated board from which copper has been selectively removed to leave a reference track and four code tracks. The code areas are one inch long. The moveable capacitor plate is made from a rectangle of the same material, with the copper covered with Kapton tape to form a dielectric. FIG. 20 is a graph depicting measured data over the first four portions in 0.25" increments. The changes from "0" to "1" in the code can be seen.

Figure 21:
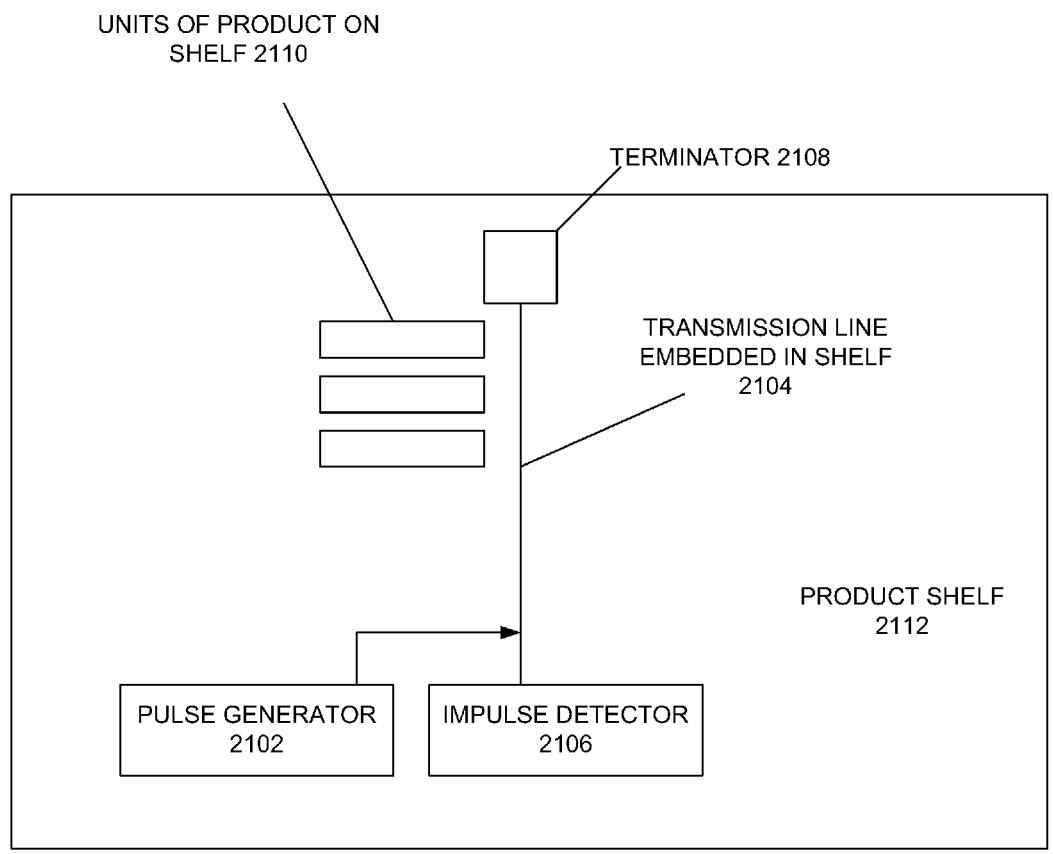
FIG. 21 is a block diagram depicting a transmission line reflection sensing counter.

FIG. 21 is a block diagram depicting a transmission line reflection sensing counter. When a short (in time) electrical impulse is applied to the terminals of a transmission line using a pulse generator 2102, the pulse will travel along a transmission line 2104 at a speed equal to the speed of light multiplied by the "velocity factor" of the transmission line 2104. If the line 2104 is of uniform characteristic impedance, this impulse looks the same at each point along the transmission line 2104, apart from attenuation due to the characteristics of the materials that make up the transmission line 2104, and a time delay. If the impulse encounters a portion of the line 2104 where there is an impedance different from the so-called "characteristic impedance of the line", the impulse splits into two components. One continues on down the line 2104, slightly diminished in amplitude (called the forward pulse), and the other is reflected back toward the input end of the transmission line (the reflected pulse). If the input end of the cable is observed, say with an oscilloscope or impulse detector 2106, the source pulse and the reflected pulse may be observed, separated in time. The time difference between them is equal to twice the travel time from the input end of the transmission line 2104 to the source of the reflection. This approach has been used for decades to locate the source of problems on transmission lines 2104, cables etc. Under appropriate conditions, a transmission line 2104 having multiple impedance discontinuities will show reflections from all of these. A transmission line 2104 which is infinitely long or one that is terminated with an impedance 2108 equal to its characteristic impedance will have no reflections. The approach works well in all types of transmission lines, such as coaxial cable, parallel wire transmission line, microstrip line, and twisted pairs. Coaxial cable confines the fields associated with transmission of signals entirely within its structure. Some types of transmission line, such as parallel wire line and microstrip line have fields which extend significant distances beyond the physical extents of the transmission line. Objects 2110, such as units of product on a shelf 2112, nearby the line 2104 will interact with the field and cause the impedance to change, generating a source for a potential reflection of a pulse.

This gives rise to the notion of using such a line 2104 to monitor the presence or absence of objects 2110 in its vicinity. For instance, a suitable transmission line 2104 could be embedded in the shelf 2112 of a display on which products 2110 are to be placed, and fitted at one end with a pulse generator 2102 and a means of detecting reflections 2106 and at the other end with a termination 2108. With no stock on the shelf 2112, the pulses are all absorbed by the termination 2108. As product 2110 is placed on the shelf, reflections will begin to appear. The implementation issues in doing this are mostly to do with the requirement for very precise resolution in time. Using the rule of thumb that in one nanosecond an electromagnetic wave travels a foot in free space, one can see that if the objects 2110 to be monitored are inches in diameter, resolution of better than one nanosecond is required. This is no problem for lab equipment, particularly if a human is interpreting, say, an oscilloscope display. Trying to do this automatically and inexpensively using limited electrical power is not an easy task. Apart from the pulse generator 2102, there is the need for a so-called directional coupler connected between the pulse generator 2102 and the input of the transmission line 2104, and a high-speed high-resolution analog-to-digital convertor (ADC) 2106. After the pulse is generated, the ADC 2106 samples the reflected signal arm of the directional coupler until all reflections have died away. Successive samples are stored in computer memory, and can then be processed by a computer program to reveal the impedance discontinuities that reveal the presence of product 2110 on the shelf 2112.

In one example, the signal at the reflected arm of the directional coupler can be passed to a simple diode detector. All the reflected signals can be rectified and averaged. Under conditions of no stock, the output from the detector 2106 was low. As stock was added, the signal level rose. Such detection may work best as a "none or some" monitor. If the output of coupler is digitized with sufficient resolution, identification of the location of individual items can be achieved.

Another use of impulse functions is in determining the frequency response of networks. This can be accomplished by using mathematical properties of the Fourier Transform. Applying the Fourier Transform (actually the so-called Fast Fourier Transform, or FFT) to a time-sequence of samples yields a frequency-sequence of results. The time response and frequency response form a so-called Fourier Transform pair. In general, the more compressed a signal is in time, the more spread out it is in frequency, and vice versa. An infinitely narrow impulse has a uniform spectrum from DC to infinite frequency. A narrow pulse in the nanosecond range will have a spectrum stretching out beyond 1 GHz. Hence a network, such as a filter, can be subjected to a single impulse, and then its frequency response is simply the FFT of the output of the network. In this way, the frequency response can be obtained very conveniently, without having to use a swept source to measure at every frequency.

The present approach is to do this the other way round. First the transmission line is swept, recording the output of the directional couplers reflected arm over a wide range of frequencies. The amplitude and phase of the steady state response is recorded. The results are, in fact, the same coefficients that would have been determined using the impulse method. By applying an FFT to the steady state coefficients then, one obtains the impulse response of the transmission line—a sequence of values stretching over a time interval. This set of values will look just like the TDR results, but obtained in a quite different way. If a low power, wide frequency range network analyzer is built, it can be used to obtain the required frequency response values. With recent advances in Direct Digital Synthesis (DDS) integrated circuits, building a simple vector network analyzer that uses modest amounts of power is becoming easier and less expensive.

TDR is a promising way to not only count products on a self, but also determine where on the shelf they are. As discussed here, it can be done either in the traditional way using an impulse or by using a vector network analyzer and applying an FFT to the results.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A capacitive inventory sensor system, comprising:
a track configured for retaining items, wherein the track includes a front portion, and wherein the track includes a pusher that is configured to move along the track and to push the items toward the front portion of the track as items are removed from the track;
a stationary first conducting plate positioned along a length of the track;
a stationary second conducting plate positioned along a length of the track parallel with the stationary first conducting plate;
a moveable third conducting plate connected to the pusher, wherein a face of the third conducting plate is positioned opposite a face of the first conducting plate and a face of the second conducting plate such that the moveable third conducting plate overlaps a portion of the first conducting plate and a portion of the second conducting plate;
a capacitance sensor configured to measure a combined capacitance formed among the first conducting plate, the second conducting plate, and the third conducting plate, wherein the measured capacitance varies based on a position of the pusher along the track.

2. The sensor system of claim 1, further comprising a data processor configured to determine a number of items present on the track based on the measured capacitance.

3. The sensor system of claim 1, further comprising a data processor configured to determine the position of the pusher based on the measured capacitance.

4. The sensor system of claim 1, wherein the position of the pusher is determined according to:

$$x=2(C_m-C_1)/m$$

where x is the position of the pusher, $C_m$ is the measured capacitance, $C_1$ is the capacitance between the first conducting plate and the second conducting plate, and m is a constant.

5. The sensor system of claim 1,
wherein the position of the pusher is determined according to:

$$x=2(C_m-C_1)/m$$

where x is the position of the pusher, $C_m$ is the measured capacitance, $C_1$ is the capacitance between the first conducting plate and the second conducting plate, and $$m=k*a/d,$$

where k is a constant, a is an area of a face of the first conducting plate overlapped by the third conducting plate, and d is a distance of separation between the first and second conducting plates and the moveable third plate.

6. The sensor system of claim 1, further comprising a force mechanism, wherein the force mechanism is configured to force the pusher toward the front portion of the track as items are removed from the track.

7. The sensor system of claim 6, wherein the force mechanism comprises a spring.

8. The sensor system of claim 1, wherein the face of the first conducting plate and face of the second conducting plate are substantially rectangular.

9. The sensor system of claim 1, wherein the face of the first conducting plate varies in width along the length of the track.

10. The sensor system of claim 1, wherein the first and second conducting plates run the length of the track.

11. The system of claim 1, further comprising a transmitter, wherein the transmitter is configured to transmit an alert indicative of a number of items retained by the track.

12. The system of claim 11, further comprising a processor configured to determine a number of items retained by the track based on the measured capacitance.

13. The system of claim 12, wherein the processor is configured to cause the transmitter to transmit an alert when the number of items meets one or more threshold criteria.

14. A capacitive inventory sensor system, comprising:
a track configured for retaining items, wherein the track includes a front portion, and
wherein the track includes a pusher that is configured to move along the track and to push the items toward the front portion of the track as items are removed from the track;
a stationary first conducting plate positioned along a length of the track;
a stationary second conducting plate positioned along a length of the track parallel with the stationary first conducting plate; a moveable third conducting plate connected to the pusher, wherein a face of the third conducting plate is positioned opposite a face of the first conducting plate and a face of the second conducting plate such that the moveable third conducting plate overlaps a portion of the first conducting plate and a portion of the second conducting plate;
a capacitance sensor configured to measure a combined capacitance formed among the first conducting plate, the second conducting plate, and the third conducting plate, wherein the measured capacitance varies based on a position of the pusher along the track; and
a stationary fourth conducting plate positioned along the length of the track parallel with the stationary first and second conducting plates, wherein the capacitance sensor further measures a second combined capacitance formed among the first conducting plate, the third conducting plate, and the fourth conducting plate, wherein the position of the pusher is determined based upon the measured capacitance and the measured second capacitance.

* * * * *